(12) United States Patent
Willix et al.

(10) Patent No.: US 7,207,172 B2
(45) Date of Patent: Apr. 24, 2007

(54) METHOD FOR VENTILATING A WORKING MACHINE, AND SUCH A WORKING MACHINE

(75) Inventors: Michael Willix, Eskilstuna (SE); Torbjorn Borjesson, Eskilstuna (SE); Pekka Ollila, Torshalla (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/163,246

(22) Filed: Oct. 11, 2005

(65) Prior Publication Data
US 2006/0288696 A1 Dec. 28, 2006

Related U.S. Application Data

(63) Continuation of application No. PCT/SE2004/000494, filed on Mar. 31, 2004.

(30) Foreign Application Priority Data
Apr. 16, 2003 (SE) .................... 0301123

(51) Int. Cl.
*F01N 3/02* (2006.01)
(52) U.S. Cl. ............... 60/317; 60/274; 60/289; 60/319
(58) Field of Classification Search ............ 60/274, 60/316, 317, 319, 289
See application file for complete search history.

(56) References Cited

U.S. PATENT DOCUMENTS

| | | | | |
|---|---|---|---|---|
| 3,469,566 A | * | 9/1969 | Wilkinson et al. | 60/317 |
| 4,020,915 A | * | 5/1977 | Darnell et al. | 180/309 |
| 4,060,985 A | | 12/1977 | Fukushima | |
| 4,335,575 A | * | 6/1982 | Pagliuca | 60/319 |
| 4,339,918 A | * | 7/1982 | Michikawa | 60/316 |
| 4,388,804 A | * | 6/1983 | Bushmeyer | 60/319 |
| 4,809,502 A | * | 3/1989 | Iida et al. | 60/316 |
| 4,872,308 A | | 10/1989 | Nagai et al. | |
| 5,080,048 A | * | 1/1992 | Kudo | 123/41.64 |
| 5,282,361 A | * | 2/1994 | Sung | 60/315 |
| 5,533,869 A | * | 7/1996 | Garrison et al. | 417/234 |
| 6,832,872 B2 | * | 12/2004 | Koelm et al. | 404/108 |

FOREIGN PATENT DOCUMENTS

| | | |
|---|---|---|
| JP | 10338036 | 12/1998 |
| WO | WO 02064956 | 8/2002 |

OTHER PUBLICATIONS

International Search Report for corresponding PCT/SE2004/000494.

* cited by examiner

*Primary Examiner*—Tu M. Nguyen
(74) *Attorney, Agent, or Firm*—WRB-IP LLP

(57) ABSTRACT

A working machine includes an engine compartment, an engine hood, an internal combustion engine arranged in the engine compartment and an exhaust system, which extends from the engine out of the engine compartment via the engine hood. The exhaust system is provided with an air intake for admitting air from the engine compartment into the exhaust system and entraining the air together with the exhaust gases. The air intake includes an air baffle element, which leads the air into an essentially central area in an outlet duct, in which the exhaust gases are led out, in such a way that the air is entrained out of the engine compartment by the exhaust gases through an ejector effect which the exhaust gases exert on the air in the outlet duct.

20 Claims, 2 Drawing Sheets

METHOD FOR VENTILATING A WORKING MACHINE, AND SUCH A WORKING MACHINE

The present invention is a continuation of PCT/SE2004/000494, filed Mar. 31, 2004, which claims priority to SE 0301123-6, filed Apr. 16, 2003, both of which are hereby incorporated by reference.

BACKGROUND AND SUMMARY

The present invention relates to a working machine, comprising an engine compartment, an engine hood, an internal combustion engine arranged in the engine compartment and an exhaust system which extends from the engine out of the engine compartment via the engine hood, the exhaust system being provided with an air intake for admitting air from the engine compartment into the exhaust system and entraining the air together with the exhaust gases.

The invention also relates to a method of ventilating the engine compartment of such a working machine.

The term working machine must be regarded as signifying and includes both stationary machines and vehicles. It relates in particular to machines with substantially closed engine compartment in which the temperature can be very high and in which there is a need for ventilation of the engine compartment. Even in vehicles in which the air stream sometimes functions as a ventilator, there will be times, when the vehicle is working but is moving slowly or is stationary, where further ventilation is desirable.

The invention will be described taking a wheel loader as an example of the working machine.

Usually, in conventional wheel loaders, the engine compartment is substantially closed and high operating temperatures therefore occur in the engine compartment.

The prior art solves this problem by providing a combined air and exhaust pipe. This exhaust pipe, which defines a tailpipe of the exhaust system, extends out of the engine compartment from an opening in the engine hood. That is to say, one end of this tailpipe opens into the engine compartment, whilst the other end opens into the atmosphere. An exhaust pipe of the exhaust system extends from the engine compartment into the center of the tailpipe in order to carry the exhaust gases into the tailpipe and via this out into the atmosphere. The outer circumference of the exhaust pipe is smaller than the inner circumference of the tailpipe, so that an annular gap is formed between these pipes. Air from the engine compartment can be led out in this annular gap.

The exhaust pipe opens inside the tailpipe, which in turn means that as they flow the exhaust gases expand to a greater volume, with the result that a certain ejector effect occurs in the area where the exhaust gases flow out of the exhaust pipe and into the tailpipe. The ejector effect or ejector action will contribute and lead to the air in the surrounding, annular gap being entrained by the exhaust gases out through the tailpipe into the surrounding atmosphere.

It is desirable to provide a method and a working machine which will produce more efficient ventilation of an engine compartment than the prior art.

It is desirable to provide such a method and working machine wherein the principle of utilizing the ejector effect to ventilate air out of the engine compartment is used to better effect in comparison to the prior art. An aspect of the present invention proposes a method and a working machine, which in its practical application takes up relatively little space inside the engine compartment and which provides a robust and reliable solution to the problem of ventilating closed or at least substantially closed engine compartments.

According to an aspect of the invention, in a method, air is led in essentially centrally into an outlet duct and the exhaust gases are led into an outlet duct outside, that is to say radially outside, around the air, in such a way that the air is entrained out of the engine compartment by the exhaust gases through an ejector effect that is produced by the exhaust gases.

Leading the air in centrally into an outlet duct, preferably formed by a tailpipe projecting from the engine hood, instead of leading the air into an annular gap surrounding the exhaust pipe, from which the exhaust gases are introduced into the outlet duct, as in the prior art, gives a stronger ejector effect. Compared to the prior art, a larger quantity of air can thereby by entrained by a given quantity of exhaust gases.

According to a preferred embodiment of the invention the air is led into the outlet duct in proximity to an extremely hot and/or temperature-sensitive location in the engine compartment, preferably directly opposite a turbo unit or engine manifold. That is to say air is drawn from a location in the engine compartment where the need for ventilation is greatest.

According to a further aspect of the invention, in a working machine, the air intake comprises an air baffle element which leads the air into an essentially central area in an outlet duct in which the exhaust gases are led out, in such a way that the air is entrained out of the engine compartment by the exhaust gases through an ejector effect which the exhaust gases exert on the air.

According to a preferred embodiment of the invention the air baffle element comprises a pipe which extends into and essentially coaxially with the outlet duct. The term pipe must be regarded as signifying and also includes very short pipes or conduits. The pipe may have a varying wall thickness and also a varying inner and outer radius over its length.

The air baffle element preferably forms an air baffle duct, the cross-section of which diminishes toward the point where it opens into the outlet duct. That is to say, the air baffle element is funnel-shaped. In this way air can be effectively entrained and led into the outlet duct.

The arrangement advantageously comprises means of directing the exhaust gases along an annular gap in the part of the outlet duct where the air baffle element introduces the air. The function of these means, in other words, is to direct the exhaust gases so that these flow in a gap in the outlet duct which precedes a part of the outlet duct where they are permitted to expand to a larger volume together with the air from the air baffle element. The gap should be situated radially outside the air baffle element. In this case the gap need not be continuous in a circumferential direction, although this is preferable. Its cross-sectional area, or flow area, should be so great that it does not generate a resistance to the exhaust gas flow large enough to risk choking the engine. However, its area should not be too large, since this would result in too low an exhaust gas speed and insufficient ejector effect when the gases are permitted to expand in the outlet duct. The outlet duct has a cross-sectional area which is significantly larger than the cross-sectional area of the gap, and which is preferably equal to the sum of the mouth area of the air baffle duct and the gap area.

The means of directing the exhaust gases along an annular gap preferably comprise the outer periphery of the air baffle element.

The outlet duct in which the air baffle element extends is then defined by a wall, which has an inner periphery extending at a constant distance from the outer periphery of the air baffle element in the area where the wall and the air baffle element overlap one another. Air and exhaust gases thereby flow in a parallel direction into the common outlet duct. The air baffle element extends far enough from its engine compartment orifice to avoid a backflow of air (and exhaust gases) into the engine compartment via the air baffle duct of the air baffle element. The flow directions of the exhaust gases and the air as they enter the common part of the outlet duct are also designed to prevent such backflow.

According to a preferred embodiment of the invention the exhaust system comprises a chamber into which the exhaust gases are led via an exhaust pipe connected thereto and into which the air baffle element projects from one direction and from which the outlet duct, into which the air baffle element opens, leads out in an opposite direction. The chamber acts as a collecting chamber, in which the exhaust gases are collected and distributed all around the air baffle element, which projects through the chamber and into the outlet duct.

BRIEF DESCRIPTION OF THE DRAWINGS

Preferred examples of embodiments of the present invention will be described below by way of example, with reference to the drawings attached, in which.

DETAILED DESCRIPTION

Figure 1:
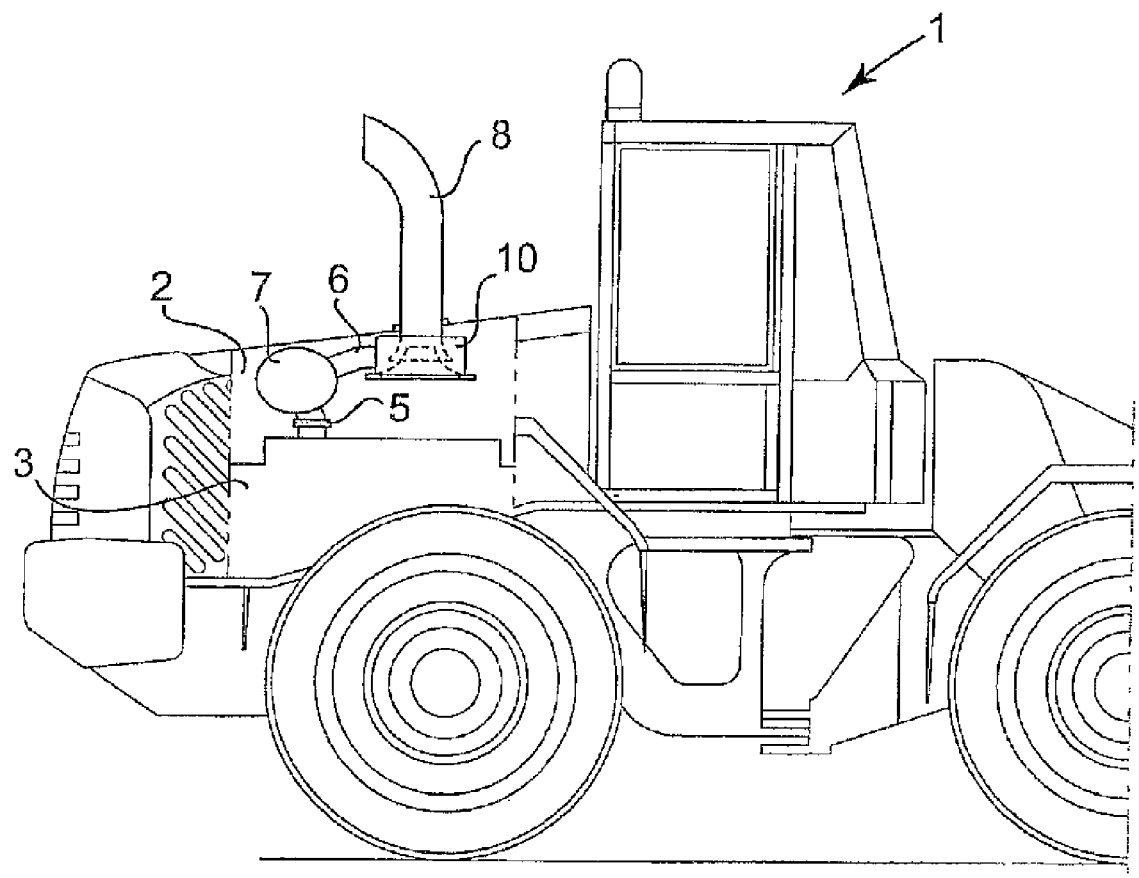
FIG. 1 is a schematic partially sectional side view of a working machine according to the invention.
Figure 2:
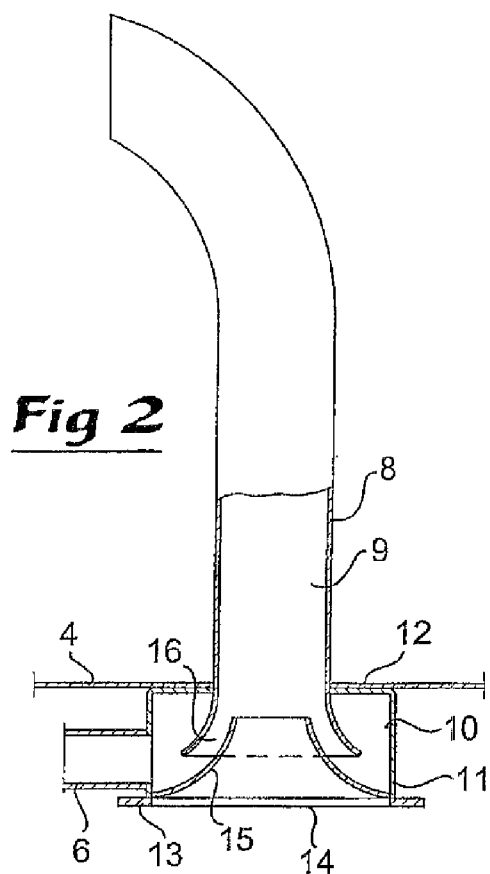
FIG. 2 is an enlarged cross-sectional figure of a detail in FIG. 1.
Figure 3:
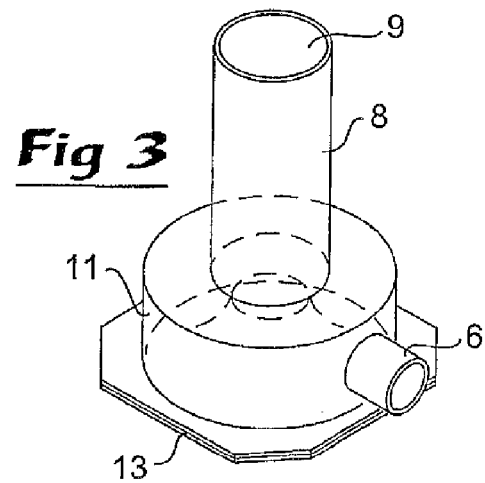
FIG. 3 is a perspective view of the detail in FIG. 2.
Figure 4:
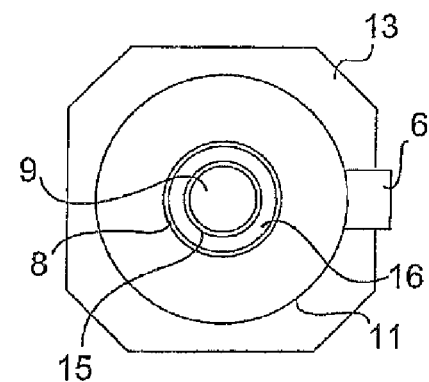
FIG. 4 is a cross section, viewed from above, of the example of an embodiment in FIG. 2.

FIG. 1 shows a working machine 1 which typically is a conventional wheel loader, but might be any working machine which has a substantially closed engine compartment with a need for active ventilation during operation.

The working machine 1 comprises an engine compartment 2, an internal combustion engine 3 arranged in the engine compartment, and an engine hood or casing 4, which separates the engine compartment 2 from the surrounding atmosphere. The working machine 1 further comprises an exhaust system 5, via which exhaust gases are led from the engine 3 to the atmosphere. The exhaust system 5 comprises an exhaust pipe 6 and a silencer 7, together with a tailpipe 8, which extends outwards from the engine hood 4 and forms an outlet duct 9. The exhaust pipe 6 extends from the engine 3 via the silencer 7 up to the tailpipe 8.

The exhaust pipe 6 opens into a chamber 10, which is formed by an essentially cylindrical side wall 11, an annular end wall 12 which is connected to the tailpipe, and a second end wall 13 situated opposite the end wall. The tailpipe 8 extends down into the chamber 10 through the first end wall 12. The opposite end wall 13 has an opening 14, from which a pipe- and funnel-shaped air baffle element 15 extends upward through the chamber 10 far enough to overlap and to extend radially inside a part of the tailpipe 8. A gap 16, through which the exhaust gases are led from the chamber 10 into the outlet duct 9, exists between the tailpipe 8 and the air baffle element 15. The gap 16 preferably has a largely constant width over the entire overlap length, or at least over a greater part of any overlap length that exists between tailpipe 8 and air baffle element 15. The gap 16 is so narrow that a pressure build-up, and preferably also an acceleration of the rate of flow of the exhaust gases occurs therein. Its entire cross-sectional area is preferably less than the cross-sectional area of the duct in the line or the pipe 6, which carries the exhaust gases to the gap 16. The cross-sectional area of the gap 16 should be as narrow as the engine will allow, without the exhaust gas flow therefrom being restricted to such an extent that it interferes with engine operation. Optimum ejector effect is thereby also achieved in the area where the gap 16 opens into the outlet duct 9. The width (area) of the gap 16 is determined by the exhaust gas pressure which the engine imparts and the back-pressure generated by other components of the exhaust system 5, that is to say pipelines 6 and silencer 7. The length of the gap 16 naturally also affects the back-pressure generated. With the design construction described here, the gap width therefore also depends on the length of the air baffle duct of the air baffle element 15 that is required in order to prevent the air being forced back into the engine compartment.

The air baffle element 15 is formed in that a wall in the shape of a funnel or truncated cone extends from the second end wall 13 into the chamber 10. The air baffle element 15 is preferably integrally formed with the adjoining end wall 13 and is detachable either by itself or together with the end wall 13. In this way one and the same chamber wall construction can be used for different engines, the single difference being that differently shaped air baffle elements (different with regard to length and width, for example) are coupled to the rest of the chamber wall construction depending on the quantity of exhaust gas from the engine and the flow resistance of the exhaust system in each individual case.

The chamber 10, or more specifically the walls 11, 12, 13 forming this are arranged on the inside of the engine hood 4, that is to say in the engine compartment 2. It is advantageously arranged directly opposite, for example directly above, some particularly heat-affected or heat-sensitive component in the engine compartment 2. Examples of such typically heat-affected components are a manifold or a turbo unit (not shown).

Figure 5:
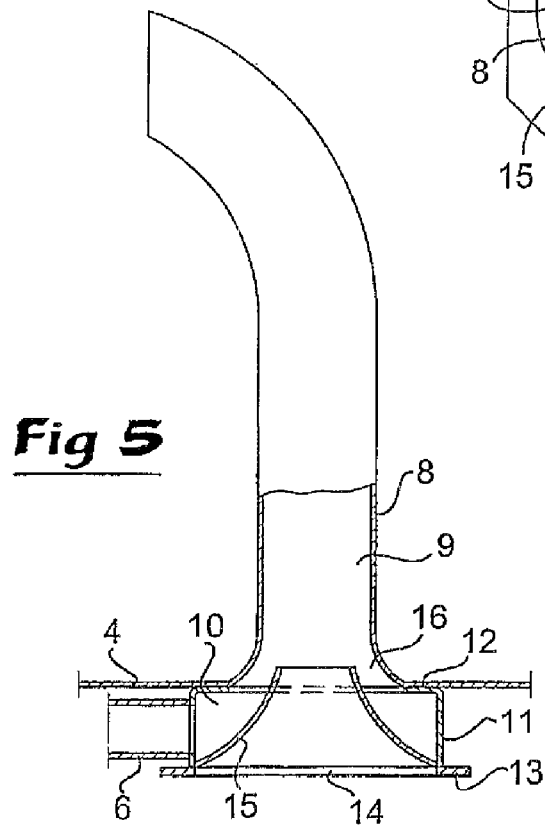
FIG. 5 is a representation corresponding to that in FIG. 2 of an alternative example of an embodiment of the invention.

FIG. 5 shows an alternative embodiment of the arrangement according to the invention, in which the tailpipe 8 emerges from the end wall 12 connected thereto without projecting into the chamber 10. In this way a more compact chamber construction is obtained. The air baffle element 15 extends through the chamber 10 and, as previously, into the tailpipe 8. In other words, the air baffle element 15 in this case projects right through the chamber 10.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

It will be appreciated that a number of variants of the invention will be obvious to a person skilled in the art without departing from the scope of the invention, as defined in the claims attached, based on the description and the drawings.

For example, the air baffle element may obviously be of some design shape other than that described above. The chamber 10 is preferably, but need not necessarily be arranged above some heavily heat-affected component. The inlet to the air baffle element is the part which should be arranged in proximity to such a component. The chamber may furthermore be arranged outside the engine hood, although it is preferably arranged inside the latter.

What is claimed is:

1. A method of ventilating an engine compartment of a working machine, which in addition to the engine compartment comprises an engine hood, an internal combustion engine arranged in the engine compartment and an exhaust system, the exhaust system extending from the engine out of the engine compartment via the engine hood, comprising:
   admitting air from the engine compartment into the exhaust system through an air intake;
   entraining the air together with exhaust gases from the internal combustion engine;
   the air being admitted essentially centrally into an outlet duct of the exhaust system;
   leading the exhaust gases into the outlet duct around the admitted air such that the admitted air is entrained out of the engine compartment by the exhaust gases through an ejector effect that is produced by the exhaust gases.

2. The method as claimed in claim 1, comprising admitting the air into the outlet duct proximate a turbo unit of the internal combustion engine.

3. The method as claimed in claim 1, comprising admitting the air into the outlet duct proximate a manifold of the internal combustion engine.

4. A working machine comprising:
   an engine compartment,
   an engine hood,
   an internal combustion engine arranged in the engine compartment and
   an exhaust system, the exhaust system extending from the engine out of the engine compartment via the engine hood, the exhaust system comprising an air intake for admitting air from the engine compartment into the exhaust system and entraining the air together with the exhaust gases, the air intake comprising an air baffle element adapted to lead air into an essentially central area in an outlet duct, the outlet duct being arranged such that exhaust gases from the engine are adapted to entrain admitted air out of the engine compartment through an ejector effect which the exhaust gases exert on the admitted air in the outlet duct.

5. The working machine as claimed in claim 4, wherein the air baffle element opens proximate a turbo unit of the internal combustion engine.

6. The working machine as claimed in claim 4, wherein the air baffle element opens proximate a manifold of the internal combustion engine.

7. The working machine as claimed in claim 4, wherein the engine compartment is substantially closed.

8. The working machine as claimed in claim 4, wherein the air baffle element forms an air baffle duct, a cross section of the air baffle duct diminishing toward a point where it opens into the outlet duct.

9. The working machine as claimed in claim 4, wherein the air baffle element extends in the outlet duct, the outlet duct being at least in part defined by a pipe wall, the pipe wall having an inner periphery extending at a constant distance from an outer periphery of the air baffle element in an area where the pipe wall and the air baffle element overlap one another.

10. The working machine as claimed in claim 4, wherein the exhaust system comprises a chamber into which the exhaust gases are led via an exhaust pipe connected to the chamber, the air baffle element projecting into the chamber in one direction opening into the outlet duct, and the outlet duct leading out of the chamber in an opposite direction.

11. The working machine as claimed in claim 4, comprising a surface for directing the exhaust gases along an annular gap in the part of the outlet duct where the air baffle element introduces the admitted air.

12. The working machine as claimed in claim 11, wherein the surface comprises an outer periphery of the air baffle element.

13. The working machine as claimed in claim 4, wherein the air baffle element comprises a pipe which extends into and is essentially coaxially with the outlet duct.

14. The working machine as claimed in claim 13, comprising a surface for directing the exhaust gases along an annular gap in the part of the outlet duct where the air baffle element introduces the admitted air.

15. The working machine as claimed in claim 14, wherein the surface comprises an outer periphery of the air baffle element.

16. The working machine as claimed in claim 13, wherein the air baffle element forms an air baffle duct, a cross section of the air baffle duct diminishing toward a point where it opens into the outlet duct.

17. The working machine as claimed in claim 16, comprising a surface for directing the exhaust gases along an annular gap in the part of the outlet duct where the air baffle element introduces the admitted air.

18. The working machine as claimed in claim 17, wherein the surface comprises an outer periphery of the air baffle element.

19. The working machine as claimed in claim 18, wherein the air baffle element extends in the outlet duct, the outlet duct being at least in part defined by a pipe wall, the pipe wall having an inner periphery extending at a constant distance from an outer periphery of the air baffle element in an area where the pipe wall and the air baffle element overlap one another.

20. The working machine as claimed in claim 19, wherein the exhaust system comprises a chamber into which the exhaust gases are led via an exhaust pipe connected the outlet duct, and the outlet duct leading out of the chamber in an opposite direction.

* * * * *